(12) United States Patent
Levine et al.

(10) Patent No.: US 9,658,101 B1
(45) Date of Patent: May 23, 2017

(54) MULTI-LAYER DOSIMETER USABLE WITH SUNSCREEN AND METHODS FOR PREPARATION AND USE

(71) Applicant: Jads International LLC, Lutherville (MD)

(72) Inventors: Andrew Seth Levine, Lutherville, MD (US); Alexandra Michele Levine, Lutherville, MD (US); Nicole Ann Zujovic, Baltimore, MD (US)

(73) Assignee: JADS INTERNATIONAL LLC, Lutherville, MD (US)

(*) Notice: Subject to any disclaimer, the term of this patent is extended or adjusted under 35 U.S.C. 154(b) by 0 days.

(21) Appl. No.: 15/066,847

(22) Filed: Mar. 10, 2016

(51) Int. Cl.
 *G01N 5/00* (2006.01)
 *G01J 1/50* (2006.01)
 *G01T 1/02* (2006.01)

(52) U.S. Cl.
 CPC . *G01J 1/50* (2013.01); *G01T 1/02* (2013.01)

(58) Field of Classification Search
 CPC .................................. G01T 1/06; G01T 1/11
 See application file for complete search history.

(56) References Cited

U.S. PATENT DOCUMENTS

| | | | |
|---|---|---|---|
| 3,787,687 A | 1/1974 | Trumble | |
| 3,903,423 A | 9/1975 | Zweig | |
| 4,659,649 A | 4/1987 | Dickinson et al. | |
| 4,705,046 A | 11/1987 | Robillard | |
| 4,829,187 A | 5/1989 | Tomita et al. | |
| 5,117,116 A | 5/1992 | Bannard et al. | |
| 5,296,275 A | 3/1994 | Goman et al. | |
| 5,581,090 A | 12/1996 | Goudjil | |
| 5,589,398 A | 12/1996 | Krause et al. | |
| 5,612,541 A | 3/1997 | Hoffmann et al. | |
| 5,914,197 A | 6/1999 | Goudjil | |
| 5,986,273 A | 11/1999 | Tripp et al. | |
| 6,132,681 A | 10/2000 | Faran et al. | |
| 6,504,161 B1 | 1/2003 | Jackson et al. | |
| 6,734,440 B2 | 5/2004 | Questel et al. | |
| 6,818,904 B1 | 11/2004 | Ferren et al. | |
| 8,115,182 B1 * | 2/2012 | Patel ........................ | G01T 1/04 250/482.1 |
| 8,961,897 B2 | 2/2015 | Faran | |
| 2001/0019110 A1 | 9/2001 | Faran et al. | |
| 2002/0022008 A1 | 2/2002 | Forest et al. | |

(Continued)

*Primary Examiner* — Kiho Kim
(74) *Attorney, Agent, or Firm* — Ladas & Parry LLP (57) ABSTRACT

A device for measuring or detecting UV radiation that is usable with sunscreen, the device including:
(a) a colorant layer having at least one photochromic material that is capable of changing its color when exposed to UV radiation, and
(b) an over-layer atop the colorant layer having (i) a bottom surface that is in contact with a top surface of the colorant layer and (ii) an opposing top surface, the over-layer having a material that is constructed and arranged to allow at least a portion of the sunscreen, when deposited on the top surface of the over-layer, to be absorbed by the over-layer while preventing the sunscreen so deposited from penetrating through the over-layer to the colorant layer, the over-layer being transparent to allow UV radiation to pass through the over-layer to the colorant layer at least when the surface of the over-layer is not covered with the sunscreen. Also, methods for preparing and using the device.

20 Claims, 3 Drawing Sheets

(56) References Cited

U.S. PATENT DOCUMENTS

| | | | |
|---|---|---|---|
| 2004/0109789 A1 | 6/2004 | Faran et al. | |
| 2005/0285050 A1* | 12/2005 | Bruce | G01J 1/50 |
| | | | 250/474.1 |
| 2006/0145091 A1* | 7/2006 | Patel | G01T 1/04 |
| | | | 250/474.1 |
| 2012/0137958 A1 | 6/2012 | Mills et al. | |
| 2012/0181453 A1* | 7/2012 | Patel | G01T 1/06 |
| | | | 250/473.1 |
| 2012/0288690 A1 | 11/2012 | Forsythe | |
| 2017/0023681 A1* | 1/2017 | Patel | G01T 1/06 |

* cited by examiner

High-density polyethylene (HDPE)
(Low degree of short-chain branching)

F I G. 3A

Linear-low-density polyethylene (LLDPE)
(High degree of short-chain branching)

F I G. 3B

Low-density polyethylene (LDPE)
(High degree of short-chain branching + long-chain branching)

MULTI-LAYER DOSIMETER USABLE WITH SUNSCREEN AND METHODS FOR PREPARATION AND USE

FIELD OF THE INVENTION

The invention relates to ultraviolet (UV) indicator or dosimeter devices comprising photochromic materials that change color when exposed to UV radiation. The devices can be worn on the clothing or body of a user to monitor the amount of UV light to which the user is exposed. The devices are usable with (or without) sunscreen so that they can detect the exposure of the user to UV radiation striking the skin of the user who has applied sunscreen to his or her body. The invention also relates to simple and efficient methods for forming the devices.

BACKGROUND OF THE INVENTION

Exposure to ultra violet radiation can cause a wide range of deleterious effects in human skin, including dehydration, burning, premature aging, and discoloration. In addition, it has been widely accepted and documented that excessive exposure to ultraviolet radiation can be carcinogenic in humans. Exposure to ultraviolet radiation is of a particular concern for individuals that spend a significant amount of time outside and exposed to the sun, and those having fair complexions and who are less tolerant to the sun's ultraviolet rays. In addition, damage to the earth's ozone layer and its ability to filter out ultraviolet radiation has further raised the concern over the harmful effects that exposure to ultraviolet radiation may have.

While sunscreen preparations are, to varying degrees, reasonably effective in filtering out harmful radiation and limiting the skin's exposure to the sun, they are limited with respect to their duration of usefulness. Commercially available sunscreen preparations are rated on what is commonly referred to as a sunscreen protection factor (SPF) scale. Generally the higher the SPF factor the greater the sunscreen protection that is provided. However, often individuals are unaware of the intensity of the sun's rays during a particular time of day, or with changing weather conditions, and do not realize that sunscreen having a certain SPF factor may not protect them adequately throughout the day. Moreover, differences in climate, sunscreen formulations, activity and natural characteristics of the skin of different individuals means that the effectiveness of sunscreens may vary dramatically for the different individuals. There exist 5 skin types that differ according to the color of human hair, eyes, and skin, and by their reaction to overexposure to UV radiation. The permissible time for exposure to UV radiation on a mid-summer day changes from 15 minutes for skin type no. 1 to about 2 hours for skin type no. 5 (without using sun screen).

The dangers presented by overexposure to UV radiation makes it desirable for a user to have a device to monitor his or her exposure to UV radiation. UV indicators and dosimeters using photochromic materials are known. Photochromic materials, for example, photochromic dyes and pigments, change color upon exposure to activating light, in this case UV light. In many cases, the unactivated, original material is colorless or clear. As the activated forms of many photochromic dyes are somewhat unstable, the amount of degradation of the dye, determined for example, by a decrease in the color intensity of the activated form, can be used as a measure of the amount of UV exposure. Thus, a simple, semi-quantitative dosimeter may be prepared using photochromic materials.

For example, U.S. Pat. No. 4,829,187 to Tomita et al describes a dosimeter which uses (a) a photo activator to form free radicals upon irradiation with UV rays, (b) a coloring agent which exhibits a color change in the visible region of a spectrum through action of the free radicals; (c) a UV absorber that controls the amount of free radicals generated from the photo activator so as to enable measurement of the irradiated dose; and (d) a polymer matrix within which the constituents are contained.

Other patents and patent publications describe dosimeters which, in addition to a photochromic material, comprise a reference material that allows a user to compare the color change of the photochromic material with a color that has been predetermined to be the color that the photochromic material would be when exposed to a predetermined amount of UV radiation. Thus, U.S. Pat. No. 4,705,046 discloses a device for the qualitative measurement of UV radiation received by the skin which consists of a laminar strip comprising a photochromic material and a reference material. The reference material is suitably a dye which matches closely the color of the photochromic material after exposure to a pre-determined quantity of UV radiation. One can visually assess the exposure to UV radiation by a direct comparison of the color densities of the photochromic material and the reference material during exposure to sunlight.

Since photochromic materials often revert to their original color when the activating light is removed, other patents describe the use in a dosimeter of components, in addition to a photochromic material, to inhibit the photochromic material from reverting to its original color, i.e., to make a color change of the photochromic material irreversible. For example, U.S. Pat. No. 8,961,897 to Faran describes the distribution within a matrix, along with a photochromic compound, of a color changing agent that reacts with the photochromic compound to form a complex capable of irreversible color change after it has been exposed to a predetermined UV radiation. The particular combination of a photochromic compound, the color changing agent compound and the type of the matrix used in the measuring device is chosen so that the measuring device changes color during exposure to a predetermined dose of UV radiation according to the application, for example the dose which exceeds an individual user's permissible MED corresponding to his or her personal skin type. The particular efficacy is defined for a particular skin type, by virtue of this provision the user can choose the measuring device which is safest for user and thus avoid damage to the user's skin.

Other similar devices to those described above are found, by way of example, in U.S. Pat. Nos. 6,132,681; 6,818,904; 5,986,273; 5,589,398; 3,787,687, 5,117,116, 4,659,649, 5,296,275, 3,903,423, 5,581,090; 6,734,440, 5,612,541, and 6,504,161; and in US Pat App Pub 2001/0019110, 2004/0109789, 2002/0022008, 2012/0137958, 2005/0285050 and 2012/0288690. The disclosures of these and the other patents and patent application publications described above and throughout this specification are incorporated herein in their entirety by reference.

To make a dosimeter convenient for personal use, the prior art describes the possibility of incorporating a dosimeter into a shape that may be worn on the body or clothes of a user. Thus, U.S. Pat. No. 5,914,197 to Goudjil describes an ultraviolet active wristband comprising a clear ink composition comprised of an ink vehicle used in screen printing and a reversible photochromic compound. The ink composition is applied to a substrate and formed into the shape of an adjustable wristband.

Figure 1:
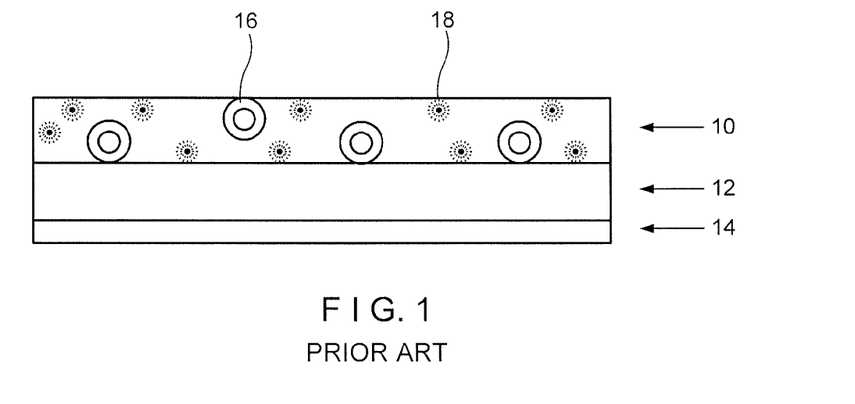
FIG. 1 is a depiction of the structure of a prior art dosimeter.

The '897 patent to Faran describes a dosimeter that may be worn by a user as a sticker or wristband and may be calibrated to work simultaneously with a sun screen that is applied to the device surface, and thus to increase the permissible time of exposure to the UV radiation. Reference is made in this respect to FIG. 1 of the drawings, which shows a prior art device comprising a polymeric matrix layer 10 atop an opaque layer 12 that is present to provide a homogenous background, and an optional third layer 14 that is made of a sticky material that can be attached to the user's skin, clothing or equipment.

The matrix 10 comprises an active photochromic compound 16 and a color changing compound 18 distributed therein. The matrix is described as being provided in order to carry the active photochromic compound 16 and to reliably protect it from corrosion due to ambient humidity and to mechanical impact. However, in the prior art device, there is nothing to protect the matrix itself from corrosion caused by sunscreen that may be applied to a surface of the matrix.

In particular, the '897 patent does not consider that the components typically found in sunscreens, including titanium dioxide and zinc oxide, may be photoactive, particularly when present as nanoparticles. They have the ability to absorb UV radiation, and in the presence of moisture convert water molecules into chemically active hydroxyl free radicals. These highly reactive chemicals are highly corrosive and, if the sunscreen comes in contact with a surface of a polymer matrix comprising a photochromic material, could etch the surface resulting in the sunscreen becoming a permanent part of the matrix material. This could prevent UV radiation from coming in contact with the photochromic material and thereby prevent a color change from occurring.

Accordingly, what is needed is a dosimeter device for use with sunscreen that has a layer of material that is preferably capable of absorbing a minimal amount of sunscreen but that nevertheless protects a matrix/photochromic layer of the dosimeter from contact with the sunscreen so absorbed. Preferably, the device is flexible enough such that, notwithstanding its multi-layer construction, it can be shaped for use as a wristband that may be comfortably worn on the wrist of a user and that has a smooth bottom layer that does not irritate the skin of the user. Preferably, also, the device can be made in a simple and cost-effective manner.

SUMMARY OF THE INVENTION

In accordance with a first embodiment of the invention there is provided a device for measuring or detecting UV radiation that is usable with sunscreen, the device comprising:
 (a) a colorant layer comprising (i) at least one photochromic material that is capable of changing its color when exposed to UV radiation, (ii) a polymer matrix in which the at least one photochromic material is distributed, wherein the polymer matrix is susceptible to corrosion when the sunscreen comprises corrosive elements and the polymer matrix comes in contact with the sunscreen, and optionally (iii) a component or components that retard a rate at which the at least one photochromic material changes its color when exposed to UV radiation or inhibits the at least one photochromic material from reverting to its original color;
 (b) an over-layer atop the colorant layer comprising (i) a bottom surface that is in contact with a top surface of the colorant layer and (ii) an opposing top surface, the over-layer comprising a material that is constructed and arranged to allow at least a portion of the sunscreen, when deposited on the top surface of the over-layer, to be absorbed by the over-layer while preventing the sunscreen so deposited from penetrating through the over-layer to the colorant layer, the over-layer being transparent to allow UV radiation to pass through the over-layer to the colorant layer at least when the surface of the over-layer is not covered with the sunscreen. The photochromic material may be one that reverts to its original color when activating UV radiation is removed. In a preferred embodiment, the colorant layer will contain the component or components that inhibit the photochromic material from reverting to its original color.

In another preferred embodiment of the invention, the polymer matrix of the colorant layer comprises low density polyethylene (LDPE) that is free of any slip or antiblock additive and the material of each of the over-layer and under-layer comprises high density polyethylene (HDPE) that is free of any slip or antiblock additive. In another preferred embodiment, the under-layer comprises a white colorant in an amount effective to provide a contrast between a color of the under-layer and a color to which the photochromic material changes when exposed to UV radiation so as to make it easier to perceive the changed color of the photochromic material than if the under-layer did not comprise the white colorant.

In yet another preferred embodiment of the invention, the top surface of the over-layer has been treated by corona discharge to give it a roughened texture whereas the bottom surface of the under-layer is smooth.

In still another preferred embodiment of the invention, the device is formed as a sticker, a badge or a wristband.

In yet another preferred embodiment of the invention, the colorant layer comprises a UV absorber, a photoinitiator, an optical brightener and/or the component or components that inhibits the at least one photochromic material from reverting to its original color.

In a still further preferred embodiment of the invention, the over-layer has a thickness of about 3.5-4.0 mil, the colorant layer has a thickness of about 14-16 mil, the under-layer has a thickness of about 2.5-3.0 mil and the total thickness of the device is about 18-22 mil.

There is also provided a method of forming the device of the first embodiment of the invention comprising the step of co-extruding the over-layer, colorant layer and under-layer simultaneously to form the device. The colorant layer is preferably formed by preparing a masterbatch comprising the at least one photochromic material and the other components of the photochromic system and blending the masterbatch with a carrier resin. In a preferred embodiment, the carrier resin is a low density polyethylene. In yet another preferred embodiment, the masterbatch is prepared by (i) mixing the photochromic material in a mixture in a primary feed, (ii) pre-melting the carrier resin in a secondary feed and (iii) combining the mixture of the primary feed and the melted carrier resin to form the masterbatch.

In accordance with a second embodiment of the invention, there is provided a device for measuring or detecting UV radiation that is usable with sunscreen, the device comprising:

(a) a support layer;

(b) a colorant layer coated on the support layer; the colorant layer comprising (i) at least one photochromic material that is capable of changing its color when exposed to UV radiation and (ii) a component or components that retard or accelerate a rate at which the at least one photochromic material changes its color when exposed to UV radiation or inhibits the at least one photochromic material from reverting to its original color;

(c) an over-layer atop the colorant layer comprising (i) a bottom surface that is in contact with a top surface of the colorant layer and (ii) an opposing top surface, the over-layer comprising a material that is constructed and arranged to allow at least a portion of the sunscreen, when deposited on the top surface of the over-layer, to be absorbed by the over-layer while preventing the sunscreen so deposited from penetrating through the over-layer to the colorant layer, the over-layer being transparent to allow UV radiation to pass through the over-layer to the colorant layer at least when the surface of the over-layer is not covered with the sunscreen. The photochromic material may be one that reverts to its original color when activating UV radiation is removed. In a preferred embodiment of the invention, the colorant layer will contain the component or components that inhibit the photochromic material from reverting to its original color.

In a more preferred embodiment, the device further comprises (a) an adhesive layer having (i) a top surface that is in contact with a bottom surface of the support layer and (ii) an opposing bottom surface, and (b) a peel layer that covers a bottom surface of the adhesive layer and that can be peeled off to expose the bottom surface of the adhesive layer.

In a further embodiment, the support layer comprises a biaxially oriented polypropylene or other polymer and a white colorant in an amount effective to provide a contrast between a color of the support layer and a color to which the photochromic material changes when exposed to UV radiation that makes it easier to perceive the changed color of the photochromic material than if the support layer did not comprise the white colorant.

In yet another embodiment, a thickness of the over-layer is about 0.90 to 1.0 mil, a thickness of the support layer is about 1.4 to 1.8 mil, a thickness of the adhesive layer is about 2.3 to 2.7 mil, and a total thickness of the device is about 4.8 to 5.2 mil.

In a still further embodiment, the device is formed as a sticker for attaching to the skin, clothes or equipment of a user.

Preferably, the dosimeter devices of both the first and second embodiments described herein are disposable.

DETAILED DESCRIPTION OF THE PREFERRED EMBODIMENTS

The present invention provides dosimeters that can be used with sunscreen, if desired, without the sunscreen having corrosive effects on photochromic materials in the dosimeters. The dosimeters are flexible enough to allow them to be shaped into a desired configuration to be worn on the wrist or other body part of a user, or on the clothes or equipment of a user, as described above and herein below.

Figure 2:
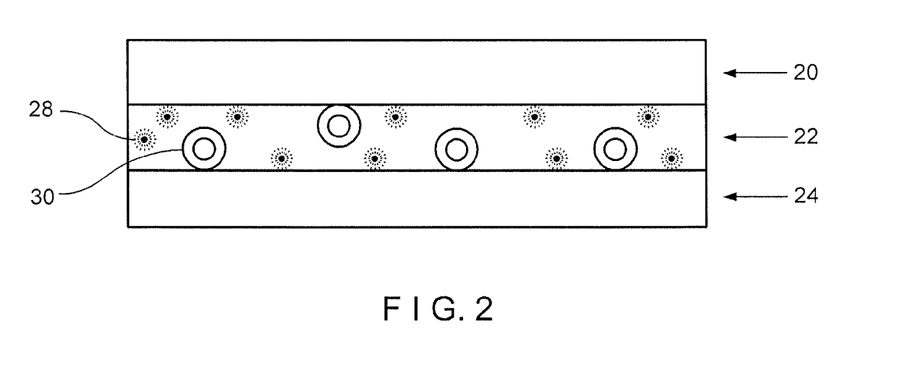
FIG. 2 is a depiction of the structure of a multi-layer dosimeter in a preferred embodiment of the invention.

Referring to FIG. 2, there is depicted a preferred dosimeter device in a first embodiment of the invention comprising three (3) layers: a top or upper layer 20, a core or colorant layer 22 and a bottom or under layer 24. The top layer 20 is preferably a Corona Treated barefoot HDPE that allows a minimal absorbency of sunscreen. The bottom layer 24 is preferably a barefoot HDPE with smooth surfaces. The core layer 22 is preferably a barefoot LDPE. One of the advantages of using LDPE in the core layer is that it gives the band a lot more flexibility and comfort for the user as compared, for example, a band that is 100% HDPE.

Advantages of the HDPE top and bottom layers 20 and 24 is that they provide sunscreen deposited on either of the layers from deep penetration. There are two reasons that this material is preferred for the top and bottom layers. One, sunscreen is a highly corrosive product that will disintegrate many materials, especially LDPE. If sunscreen comes in contact with the LDPE of the core layer 22, it could permanently etch the surface and the sunscreen could become a permanent part of the material; thus preventing UV radiation from coming in contact with photochromic pigments and/or dyes in the core layer and preventing color change. Second, the HDPE layers provide for a feel and functionality that mimic that of the skin of a user.

The Corona Treated surface of the top layer 20 has many similarities to skin when sunscreen is applied to it. First, sunscreen does absorb slightly into the skin even though it is designed to cure into a UV absorbing layer over the skin. Second, skin is never perfectly smooth as it has highs and lows due to unevenness in the pores of the skin. The top layer is designed to mimic the skin's texture as much as possible.

Figure 3A:
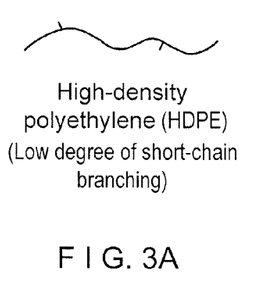
FIGS. 3A-3C are depictions of the relative degrees of branching of materials that may be used in the dosimeter according to the invention, with FIG. 3A depicting high-density polyethylene (HDPE), FIG. 3B depicting linear-low-density polyethylene (LLDPE) and FIG. 3C depicting low-density polyethylene (LDPE)
Figure 3B:
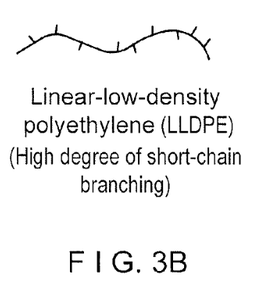
Figure 3C:
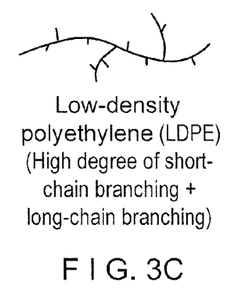

In regard to the desired absorbency of the HDPE in the top layer, FIGS. 3A-3C show the physical matrix of different polyethylenes. FIG. 3A depicts what the top layer 20 of HDPE looks like in a preferred embodiment of the invention. It has minimal amounts of fissures/openings, thus preventing heavy penetration of the sunscreen, just like skin. FIGS. 3B and 3C depict different types of LDPE, both of which comprise many fissures/openings that would allow sunscreen to penetrate too far if used as upper layer 20, thus causing corrosion to the core layer 22 with sunscreen permanently embedding SPF in the core layer material thereby preventing UV from coming in contact with the photochromic material in the core layer 22. With Corona Treated HDPE in the top layer, some sunscreen can be absorbed by the top layer but the absorbed sunscreen can be prevented from penetrating in to the core layer and attacking the LDPE layer.

Specifically, by Corona treating the HDPE on the top layer, one can create a skin-like texture that allows minimal penetration of sunscreen and allows the sunscreen to form a solid layer on it. In addition to creating a skin like texture on the top layer 20 that promotes some absorption of sunscreen, the Corona treatment provides a roughened surface that enables custom designs to be printed more easily on the top layer. This is advantageous when the device is formed, for example, as a sticker, badge or wristband that can then be displayed on the clothes or wrist of a user. It is particularly advantageous when the device is formed as a wristband.

Although the HDPE and LDPE have been described as the preferable materials for the top/bottom layers and the core layer of the device respectively in this first embodiment, this embodiment is not limited to those materials as other materials can also be used. For example, an alternative to HDPE in the top and bottom layers is polypropylene. However, this material is more brittle than HDPE and bands formed from this material may be less comfortable for a user to wear. Moreover, as discussed below, the device of the invention is preferably formed by co-extrusion and polypropylene does not extrude well with LDPE.

Other possible materials include polyester, such as polyethylene terephthalate (PET). Rubber or silicon may also be used. However, many of the surfaces create an allergic reaction to people and they are more difficult to print and cut into desired thicknesses. The preferred device does not contain allergenic materials and is very thin and easy to work with to produce a band that can be worn comfortably on the wrist of a user and that, in a preferred embodiment, is adjustable.

The colorant layer 22 of the inventive device in the first embodiment can comprise any of the photochromic materials and photochromic systems known in the prior art for monitoring the amount of UV radiation to which a user is exposed, including those described in the patents and patent publications incorporated herein by reference. In the photochromic systems used in the colorant layer, the photochromic material should be capable of undergoing color change in response to UV radiation. The color change could be reversible, but would preferably be irreversible in the sense that it would not change or reverse after it has been exposed to a predetermined amount of UV radiation. The irreversibility of color would remain irrespective of whether the device was exposed to visible sun radiation, held in darkness, or exposed to temperatures up to 50 degrees C.

By way of example, the colorant layer 22 can comprise an irreversible photochromic dye(s) or pigment(s) 30 and a UV absorber and/or UV photo-initiator 28 and/or other components that allow for calibration of the device with a desired fade down or color change of the photochromic dye(s) or pigment(s). Thus, it would be possible to adjust the sensitivity of the UV indicator device by, for example, controlling an amount of UV absorbing materials in the colorant layer 22 and/or by including a component or component that reacts with the photochromic dye(s) or pigment(s) to inhibit or accelerate color change and/or to help render the color change irreversible. Such components are known in the art as described in the patents discussed above and incorporated herein by reference.

The sensitivity of the UV indicator device can also be adjusted by adjusting a concentration or sun protection factor (SPF) factor of sunscreen that is deposited on the top layer 20 of the device. The concentration or SPF factor of the sunscreen applied on the top layer 20 will preferably be correlated to the concentration and SPF factor of sunscreen that may be simultaneously applied to the skin of a user of the device. It would then be possible from the dosimeter for a user to determine a level of accumulated ultraviolet radiation striking skin to which sunscreen of a known sun protection factor has been applied. The sunscreen applied to top layer 20 will block a corresponding amount of ultraviolet radiation from striking the colorant layer 22 as is blocked by a corresponding concentration of sunscreen applied to the body of the user. The sunscreen applied to the top layer 20 of the inventive device will prevent the photochromic material from changing to a predetermined color until a predetermined threshold level of UV radiation exposure has been reached.

From the above, it may be recognized that the sensitivity of the dosimeter may be adjusted to suit different skin types by calibration of the rate of color change of the photochromic material in the colorant layer 22 and/or by adjusting the application of sunscreen to the top layer 20 of the device. Thus, the amount and/or composition of the components that are included in the colorant layer along with the photochromic material can be adjusted to inhibit the rate of color change of the photochromic material so as to make the color change slower and more suitable for darker skin types. In other words, the dosimeter can be calibrated for specific Minimal Erythema Dose (MED) levels taking into consideration skin type and the fact that with certain skin types, e.g., skin type 1, exposure to radiation on a mid-summer day may equate to approximately 3.2 MED/hr whereas for other skin types, e.g., skin type 5, exposure may equate to 1 MED/hr. Moreover, the dosimeter can be used without the application of sunscreen, as may be suitable, for example, for users of certain skin types, e.g., skin type 1.

In the first embodiment of the invention, the device is preferably in the form of a wristband having a thickness of 18-22 mil, preferably 20 mil. Preferably, the over-layer has a thickness of 3.5-4.0 mil, preferably 3.5 mil. A thickness of the over-layer exceeding 40 mil is not desirable as, if the over-layer is too thick, less UV radiation can penetrate to the colorant layer. A preferred thickness will allow a desired amount of UV radiation to pass through the over-layer to the colorant layer when the sunscreen wears off. Moreover, an over-layer that is too thick would make the device too thick for the preferred use as a wristband.

The colorant layer has a thickness that is designed to correlate with the calibrations of color change of the masterbatch. In a preferred embodiment, the colorant layer has a thickness of 14-16 mil, and more preferably 14 mil. If the colorant layer is thicker, more masterbatch would be required to make the device thus resulting in inefficiency.

The under-layer has a thickness of 2.5-3.0 mil and preferably 2.5 mil. A white colorant, such as titanium dioxide, is preferably included in the under-layer to give the wristband a white color so that the color of the photochromic material in the colorant layer "pops out" when exposed to UV light.

In accordance with a preferred embodiment of the invention, the inventive device can be formed by preparing a masterbatch comprising the at least one photochromic material and other components and a carrier resin, with the masterbatch then being extruded with a matrix resin to form the colorant or core layer 22. A variety of processes for producing masterbatches are known in the art. For example, the following processes are conventional in the production of the masterbatches and may be used herein: a) the mixing of a suitable matrix (polymers) with the colorant and optional UV additives; b) dry blending/extrusion and kneading with subsequent grinding of the colorant concentrate; or c) dry blending/extrusion and subsequent fine spraying, hot chopping, or strand pelletizing. For example, as described in U.S. Pat. No. 7,442,742, a masterbatch composition is formed from dry blending/extrusion of a colorant, a thermoplastic carrier, a metallocene polymer processing aid, and optionally an additive. Alternatively, U.S. Pat. App. Pub. No. US 2016/0017144 to Harris describes a process comprising the steps of: a) mixing a colorant in a mixture in a primary feed; b) pre-melting a thermoplastic carrier in a secondary feed; and c) combining the mixture of the primary feed and the melted thermoplastic carrier of the secondary feed to form the masterbatch composition.

The carrier resin of the masterbatch is preferably low density polyethylene (LDPE) or linear low density polyethylene (LLDPE) since it has been found to be advantageous to produce the carrier resin for the color masterbatch out of the same or similar material as the matrix resin for the colorant layer. Due to the high degree of short and long chain branching, LLDPE has flow properties that allows the photochromic masterbatches to extrude consistently throughout the material. LLDPE is manufactured by free radical polymerization. The high degree of branches with long chains gives molten LLDPE unique and desirable flow properties and the viscosity suits well with the masterbatch consistency.

The LDPE or LLDPE gives the user a comfortable fit due to the material's softness/flexibility. Furthermore, the chemistry of LDPE/LLDPE extrudes well with the HDPE materials that it is surrounded by. Metallocene is a possible alternative for use as a matrix resin, but it has a higher melt index, which can cause issues between the masterbatch and metallocene during coextrusion. Another reason why LDPE or LLDPE is preferred over metallocene is that metallocene has many more short chain branching, which could pose problems with the stability of the color masterbatch.

In a preferred embodiment of the invention, the device can be formed, for example, by simultaneous coextrusion of the upper layer 20, colorant layer 22 and bottom layer 24 to form the device. For example, split stream feeding can be utilized to feed two or more feed streams to processing in an extruder. Coextrusion methods, such as this, are well known to those of skill in the art and can be utilized herein. For example, in the production of thermoplastic laminate structures, such as in U.S. Pat. No. 4,165,210 to Corbett, plastic laminated sheet structures are produced by the combination of two streams of molten plastic and that create a laminar flow through a die yielding a laminar sheet or tube. In U.S. Pat. No. 4,909,726 to Bekele, a coextrusion process is described in which polymer streams from multiple extruders are combined at the die of one of the extruders to form a multilayer film. In U.S. Pat. No. 5,660,922 to Herridge et al. and U.S. Pat. App. Pub. No. US 2016/0017144 to Harris, coextrusion processes are described in detail. The disclosures of each of the patents and patent applications described above, and throughout this specification, are incorporated herein by reference in their entireties.

Figure 4:
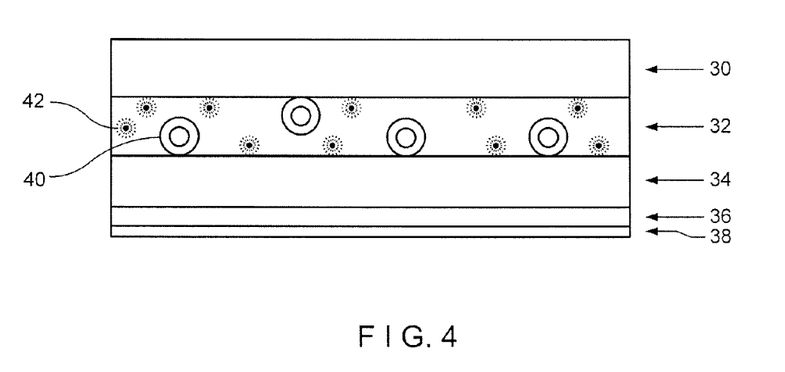
FIG. 4 is a depiction of the structure of a multi-layer dosimeter in another preferred embodiment of the invention.
Figure 5:
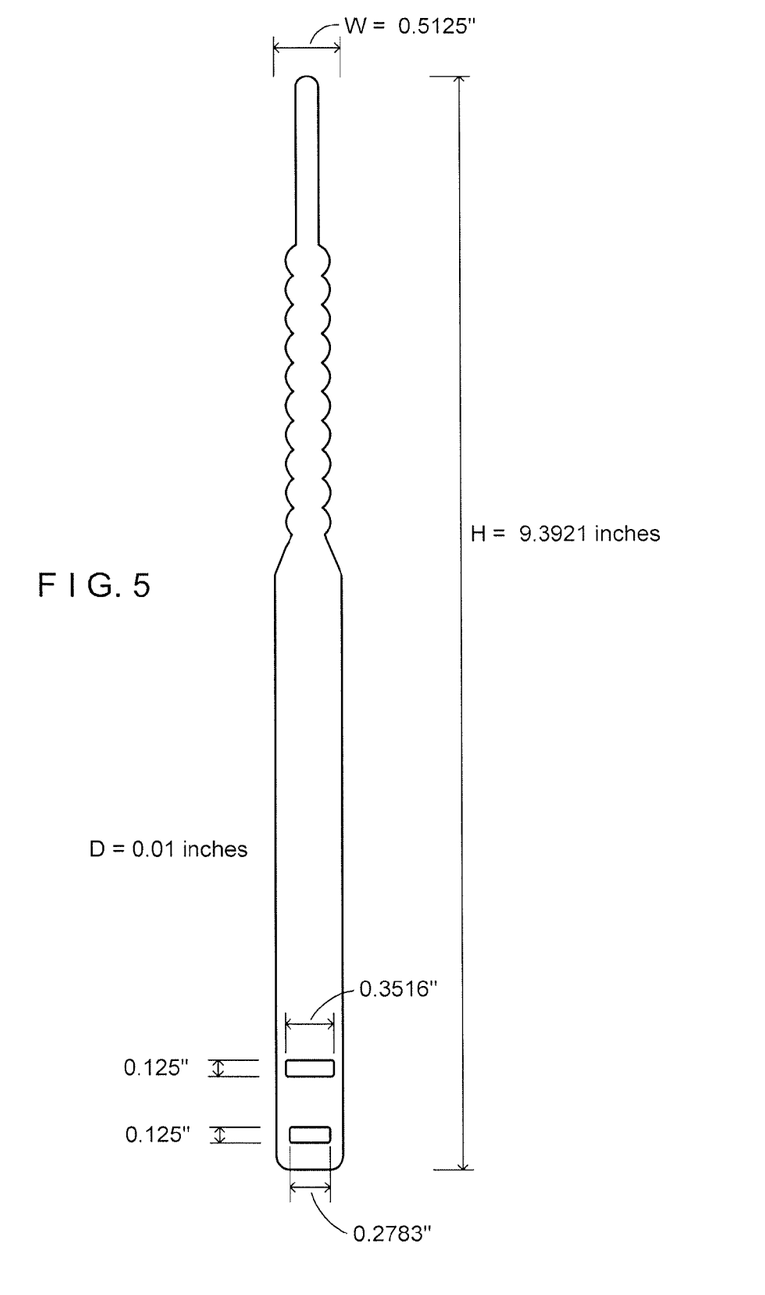
FIG. 5 is a depiction of a dosimeter of the invention in the shape of an adjustable wristband.

Reference is now made to FIG. 4, which depicts a second embodiment of a multi-layer dosimeter of the invention. This embodiment is preferable when the dosimeter is made in the form of a sticker, although it is not limited to this application. In a preferred version of this embodiment, the dosimeter comprises five (5) layers: first layer 30; second, colorant layer 32; third layer 34; fourth layer 36 and fifth layer 38.

The first layer 30 can be made of the same material as the over-layer 20 in the first embodiment. It is preferably made of a thermoplastic material, such as polyethylene terephthalate, which serves the function of protecting the second, colorant layer 32 from the corrosive effects of sunscreen applied to first layer 30 while allowing UV radiation to pass through to colorant layer 32. The colorant layer 32 is an ink coating layer that may be flood coated onto the third layer 34 by, for example, screen printing, inkjet printing or another type of printing. The composition of the flood coat of the second layer 32 can be the same as the composition of the photochromic ink in colorant layer 22 described above. That is, the ink flood coat can comprise a reversible or irreversible photochromic dye or dyes 40 and a UV absorber and/or UV photo-initiator 42. It can also include other components that allow for calibration of the device with a desired fade down or color change of the photochromic dye or dyes (in the case where the photochromic dye or dyes are irreversible).

The third layer 34 is a support layer onto which the photochromic ink composition is coated. Third layer 34 is preferably a polymer such as biaxially oriented polypropylene (BOPP) and preferably includes a white colorant to provide a contrast for the color in the second, colorant layer 32.

The fourth layer 34 is an adhesive layer of a sticky material that can be attached to the user's skin, clothing or equipment. In a preferred embodiment, the adhesive layer comprises medical transfer type adhesive that can provide a strong adherence of the dosimeter to the skin of a user. The fifth layer 38 is a protective layer for covering the adhesive layer 34 until the dosimeter is ready for use, at which time the user may peel off the protective layer 38 and adhere the dosimeter to his or her skin, clothing or equipment by means of the adhesive in adhesive layer 34.

The present invention will now be described with reference to the following non-limiting examples.

Example 1—Multi-Layer Film Construction (First Embodiment)

A composition of a preferred film is produced with barefoot HDPE & LDPE materials so that there are no UV inhibitors that block out the UV:

The bands are manufactured on a Cast Coextrusion Production Line.

The bands consist of 3 Layers ("ABA" layers) having total thickness is 20 mil as follows:

A. Top Layer is exposed to the sun and sunscreen is applied to this top layer.
   This layer is Barefoot HDPE Natural BFI 9260 Corona Texture Treated available commercially from Blueridge Films, Inc. of Disputanta VA. This HDPE material allows UV to penetrate through to the middle LDPE layer where the color sensitive photochromic inks are extruded into. The top layer is textured to mimic the skin surface as much as possible and with minimal absorbency, like skin. Top layer A is 3.5 mil thickness.

B. Middle Layer is protected by two outer HDPE layers to prevent sunscreen from corroding the photochromic color masterbatch extruded in layer B.
   This layer is produced with Barefoot LDPE BFI 345-013 (available commercially from Blueridge Films, Inc. of Disputanta VA) extruded with irreversible photochromic masterbatch. The carrier resin for the masterbatch is LDPE with a Melt Index of 18. Middle layer B is 14 mil thickness.

A. Bottom layer is in direct contact with the skin and is specifically designed to have a smooth surface.
   This layer is also barefoot HDPE Natural BFI 9260 like layer A, but it is not Corona Texture Treated. Instead, it contains 0.5% TiO2 (to add minimal white color) so that the photochromic color pops out when exposed to UV. It gives the band a slight white background. Bottom layer A is 02.5 mil thickness.

The ABA layers are produced by coextrusion. Based on the coextruded stack, the total ingredient percentages that would be as follows (all percentages are weight:

| Ingredient | % in final product |
| --- | --- |
| HDPE Top (No color) | 17.50% (3.5 mil top) |
| HDPE Bottom (white) | 12.15% (2.5 mil bottom) |

-continued

| Ingredient | % in final product |
| --- | --- |
| (TiO$_2$ White in bottom layer) | 00.35% |
| LDPE (Middle layer) | 60.00% (14 mil) |
| QCR supplied Photochromic master batch in LLDPE | 10.00% |

Assuming that there is a 10% Let Down Ratio (LDR) of the master batch, the production volumes are calculated as follows:

1. From 12.5 kg of master batch one can make 125 kg of mid layer. Mid layer is 200 micron (8 mil), so the weight of sq.m is 200 gr.
2. Therefore from 1 kg one can make 5 sq.m of mid layer.
3. From 125 kg you can make 625 sq.m of mid layer.
4. The area of band+the area around it is about 50 sq. cm, so from 1 sq.m (10000 sq.cm), you can make 200 bands.
5. 200 bands×625 sq. m=125000 bands The band preferably has a total thickness of 20 mil.

Example 2—Multi-Layer Film Construction (Second Embodiment)

Another preferred film comprises five (5) layers having the following composition:

Layer #1: Top Polyester Layer that protects inks from corrosive sunscreen and allows the transfer of UV Rays: Clear polyester (PET) Acpo L61010-0.92 mil thickness, commercially available from ACPO Ltd. of Oak Harbor, Ohio Layer #2: Ink flood coat: Irreversible Photochromic Ink of formulation described in Example 3 (below) coated on Layer #3.

Layer #3: Printing layer: BOPP (Biaxially Oriented Polypropylene) sold under product code Ritrama 4-0444 white by Ritrama Inc. of Minneapolis, Minn.—thickness of 1.6 mil Layer #4: Adhesive layer for contact with skin: 3M #1524 medical transfer tape adhesive commercially available from 3M Company of Minneapolis, Minn.—2.5 mil thickness Layer #5 Peel off layer: 3M #54 liner commercially available from 3M Company of Minneapolis, Minn.

Example 3—Ink Formulation for Incorporation into Colorant Layers

A preferred ink formulation for incorporation into the colorant layer of the invention is as follows:

| Component | Purpose | Ink Formulation | Approximate Percentages* |
| --- | --- | --- | --- |
| Polymer Matrix | Support matrix for colorant | Vinyl and/or Acrylic Resin Blend | 20-30% |
| Photochromic Colorant(s) | Initial color change with UV light activation | One or More Oxazines | <1%-3% |
| UV Photoinitiator* | Generates free radicals to permanently change color of photochromic colorant(s), calibration of color change. | Phenylphosphine oxide | |
| Light Stabilizer (Optional)* | Absorbs UV light to aid in calibration of color change, if needed. | Amino-ether type hindered amine light stabilizer (HALS) | 1-10% |
| Optical Brightener* (Optional) | Absorbs UV light & emits UV/VIS blue light, in theory contributes to photodegradation/color fade down, also enhances blue color | 2,5-thiophenediylbis(5-tert-butyl-1,3-benzoxazole) | |
| Solvents & Plasticizer | Liquid support medium for mixing and printing, balanced for performance and processing | Combination of acetate, aromatics, esters & ketones | 57-78% |

*Amounts will vary to optimize the photochemical processes of activation and photodegradation.

Although certain preferred embodiments of the invention have been described herein, it will be apparent to those skilled in the art that variations and modifications may be made without departing from the spirit and scope of the invention as defined by the following claims.

What is claimed is:

1. A device for detecting or measuring UV radiation that is usable with sunscreen, the device comprising:
    (a) a colorant layer comprising (i) at least one photochromic material that is capable of changing its color when exposed to UV radiation, (ii) a polymer matrix in which the at least one photochromic material is distributed, wherein the polymer matrix may be susceptible to corrosion when the sunscreen comprises corrosive elements and the polymer matrix comes in contact with the sunscreen and optionally (iii) a component or components that change a rate at which the at least one photochromic material changes its color when exposed to UV radiation or inhibits the at least one photochromic material from reverting to its original color;
    (b) an over-layer atop the colorant layer comprising (i) a bottom surface that is in contact with a top surface of the colorant layer and (ii) an opposing top surface, the over-layer comprising a material that is constructed and arranged to allow at least a portion of the sunscreen, when deposited on the top surface of the over-layer, to be absorbed by the over-layer while preventing the sunscreen so deposited from penetrating through the over-layer to the colorant layer, the over-layer being transparent to allow UV radiation to pass through the over-layer to the colorant layer at least when the surface of the over-layer is not covered with the sunscreen.

2. The device according to claim 1, wherein the polymer matrix of the colorant layer comprises low density polyethylene (LDPE) that is free of any slip or antiblock additive.

3. The device according to claim 2, wherein the material of the over-layer comprises high density polyethylene (HDPE) that is free of any slip or antiblock additive.

4. The device according to claim 3, further comprising an under-layer having (i) a top surface that is in contact with a bottom surface of the colorant layer and (ii) an opposing bottom surface, the under-layer comprising high density polyethylene (HDPE) that is free of any slip or antiblock additive.

5. The device according to claim 4, wherein the under-layer comprises a white colorant in an amount effective to provide a contrast between a color of the under-layer and a color to which the photochromic material changes when exposed to UV radiation that makes it easier to perceive the changed color of the photochromic material than if the under-layer did not comprise the white colorant.

6. The device according to claim 5, wherein the top surface of the over-layer has been treated by corona discharge to give it a roughened texture whereas the bottom surface of the under-layer is smooth.

7. The device according to claim 6, which is formed as a sticker, a badge or a wristband.

8. The device according to claim 6, wherein the over-layer has a thickness of about 3.5-4.0 mil, the colorant layer has a thickness of about 14-16 mil and the under-layer has a thickness of about 2.5-3.0 mil.

9. The device according to claim 8, wherein the device is a wristband having a thickness of about 18 to 22 mil.

10. A method for forming the device according to claim 4 comprising the step of co-extruding the over-layer, colorant layer and under-layer simultaneously to form the device.

11. The method for forming the device according to claim 10, wherein the colorant layer is formed by preparing a masterbatch comprising the at least one photochromic material and optional UV additives and blending the masterbatch with a carrier resin.

12. The method for forming the device according to claim 11, wherein the carrier resin is a low density polyethylene.

13. The method for forming the device according to claim 12, wherein the masterbatch is prepared by (i) mixing the photochromic material in a mixture in a primary feed, (ii) pre-melting the carrier resin in a secondary feed and (iii) combining the mixture of the primary feed and the melted carrier resin to form the masterbatch.

14. The device according to claim 1, wherein the colorant layer further comprises a UV absorber and/or photoinitiator.

15. The device according to claim 14, wherein the colorant layer comprises a component which inhibits the at least one photochromic material from reverting to its original color or causes it to change color.

16. A device for measuring or detecting UV radiation that is usable with sunscreen, the device comprising:
(a) a support layer;
(b) a colorant layer coated on the support layer; the colorant layer comprising (i) at least one photochromic material that is capable of changing its color when exposed to UV radiation and (ii) a component or components that changes a rate at which the at least one photochromic material changes its color when exposed to UV radiation or inhibits the at least one photochromic material from reverting to its original color;
(b) an over-layer atop the colorant layer comprising (i) a bottom surface that is in contact with a top surface of the colorant layer and (ii) an opposing top surface, the over-layer comprising a material that is constructed and arranged to allow at least a portion of the sunscreen, when deposited on the top surface of the over-layer, to be absorbed by the over-layer while preventing the sunscreen so deposited from penetrating through the over-layer to the colorant layer, the over-layer being transparent to allow UV radiation to pass through the over-layer to the colorant layer at least when the surface of the over-layer is not covered with the sunscreen.

17. The device according to claim 16, further comprising (a) an adhesive layer having (i) a top surface that is in contact with a bottom surface of the support layer and (ii) an opposing bottom surface, and (b) a peel layer that covers a bottom surface of the adhesive layer and that can be peeled off to expose the bottom surface of the adhesive layer.

18. The device according to claim 17, wherein the support layer comprises biaxially orient polypropylene (BOPP) and a white colorant in an amount effective to provide a contrast between a color of the support layer and a color to which the photochromic material changes when exposed to UV radiation that makes it easier to perceive the changed color of the photochromic material than if the support layer did not comprise the white colorant.

19. The device according to claim 18, wherein a thickness of the over-layer is about 0.90 to 1.0 mil, a thickness of the support layer is about 1.4 to 1.8 mil, a thickness of the adhesive layer is about 2.3 to 2.7 mil, and a total thickness of the device is about 4.8 to 5.2 mil.

20. The device according to claim 18, wherein the device is formed as a sticker.

* * * * *